April 19, 1949. L. J. LEHER 2,467,393
SUPERHEATING METHOD AND APPARATUS
Filed June 13, 1945 10 Sheets-Sheet 7
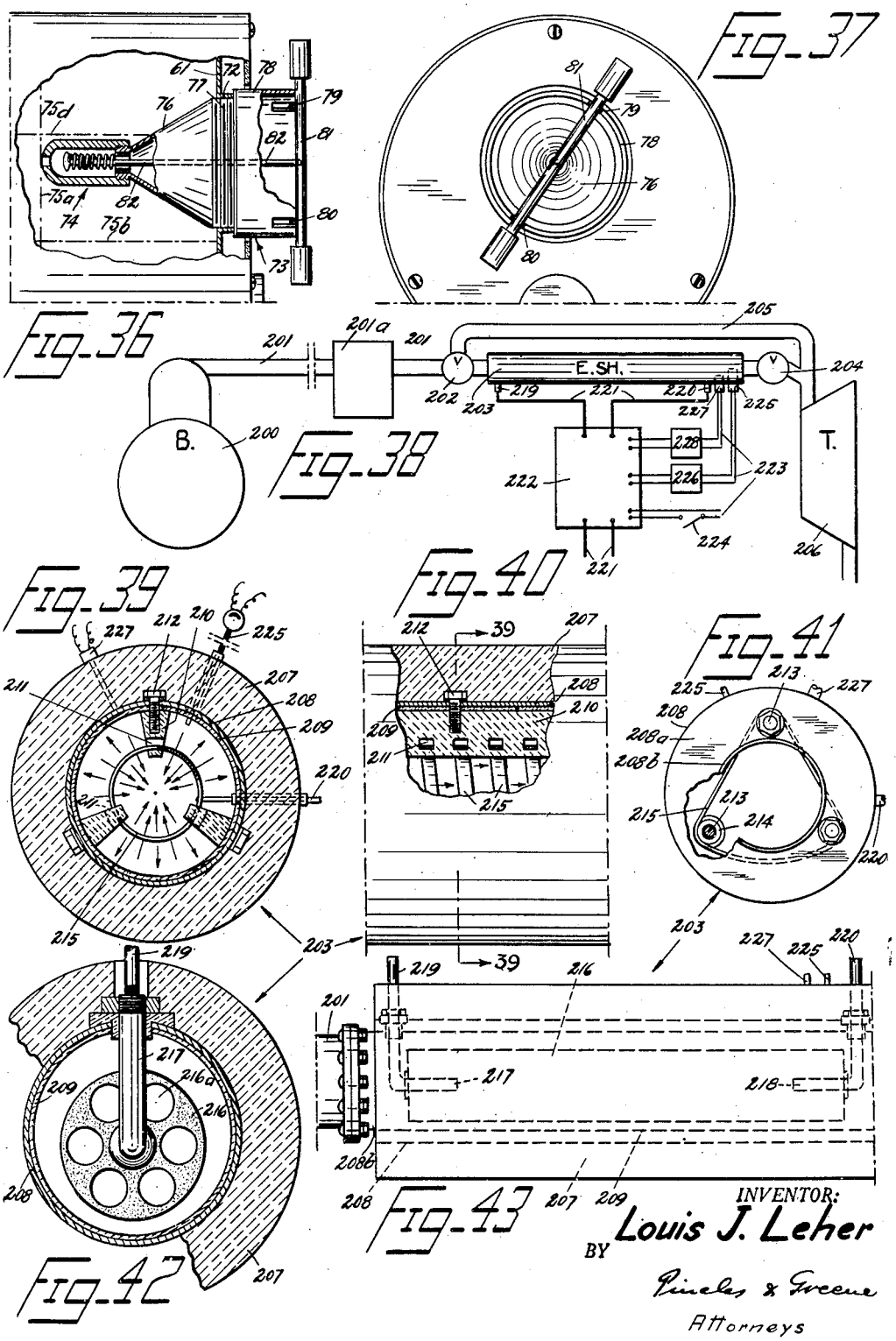
INVENTOR:
Louis J. Leher
BY
Pincles & Greene
Attorneys April 19, 1949. L. J. LEHER 2,467,393
SUPERHEATING METHOD AND APPARATUS
Filed June 13, 1945 10 Sheets-Sheet 8
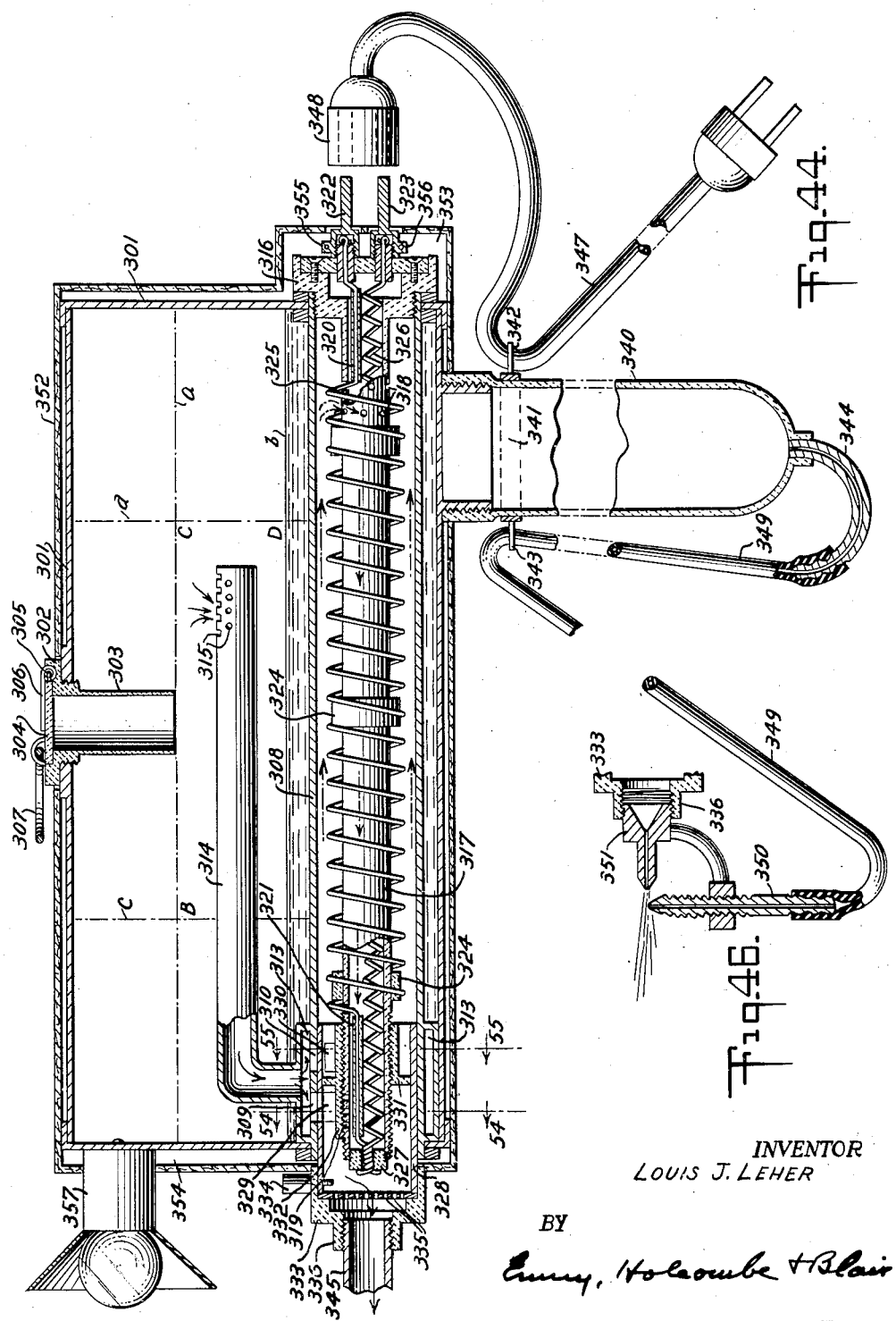
INVENTOR
LOUIS J. LEHER
BY
Emery, Holcombe & Blair
ATTORNEYS.

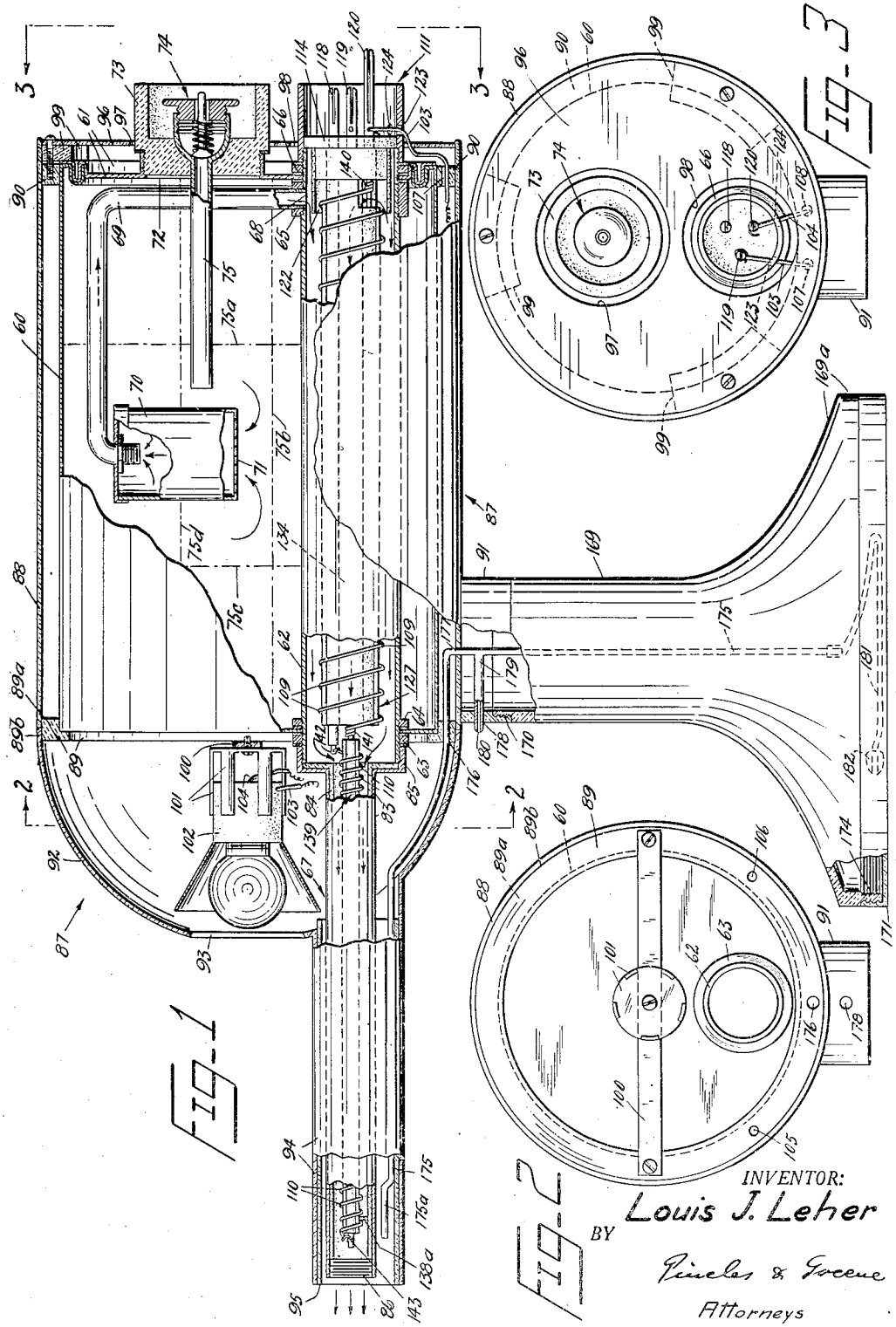

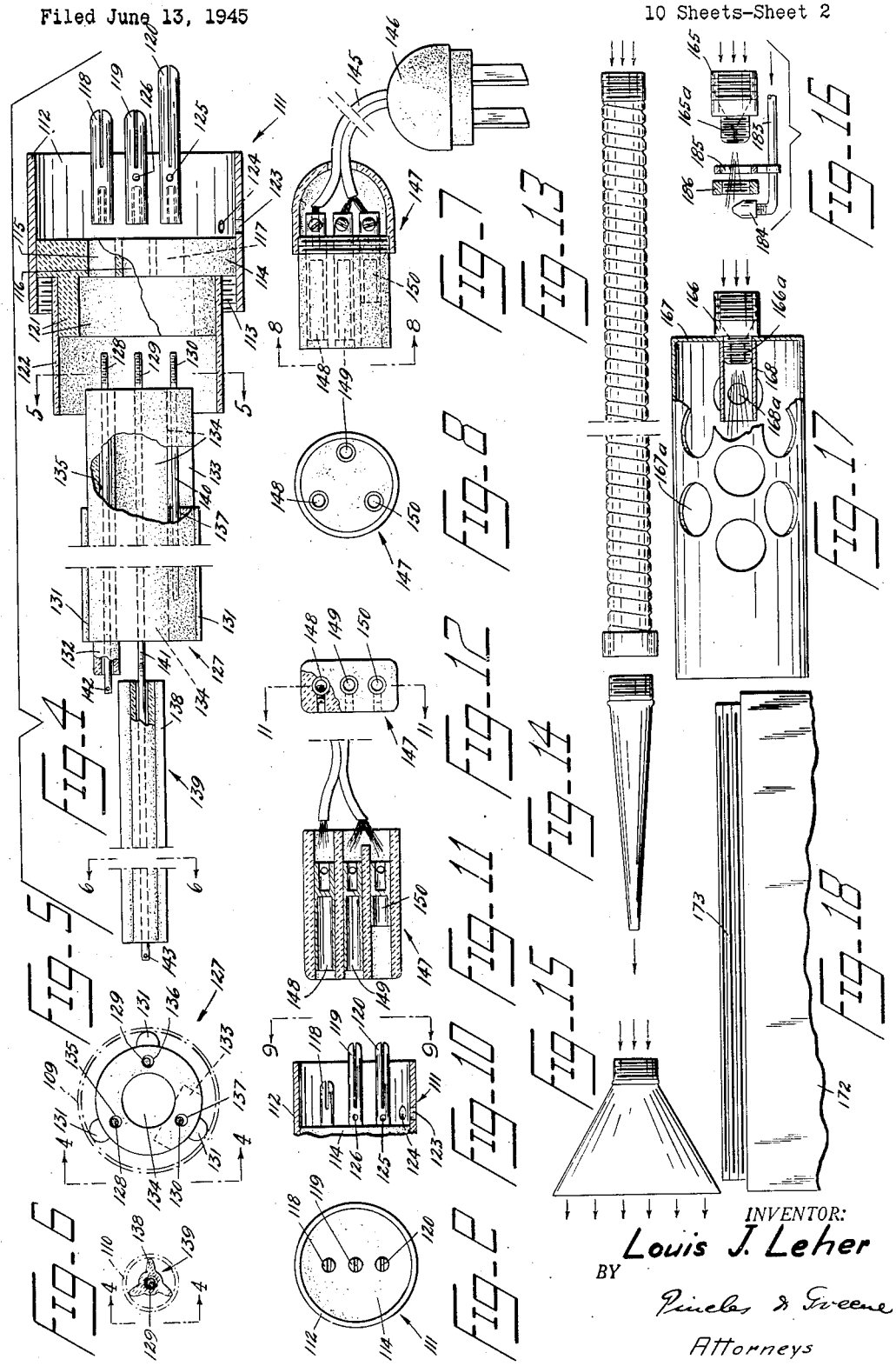

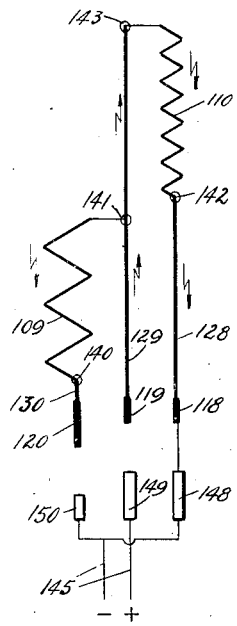
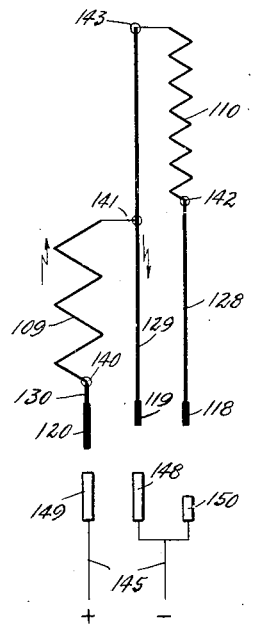
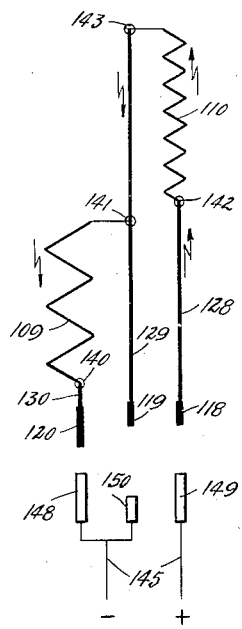
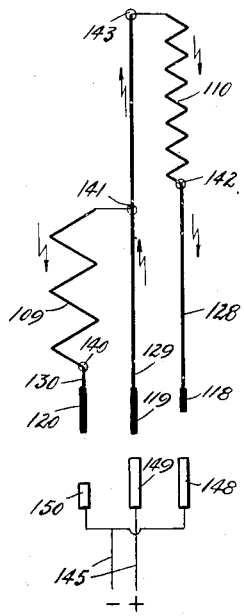
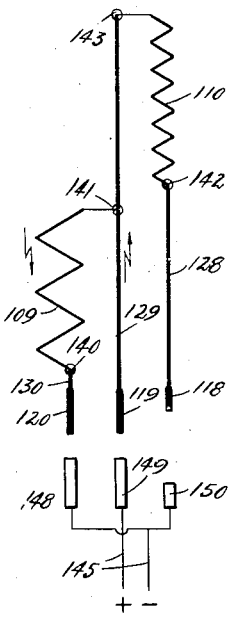
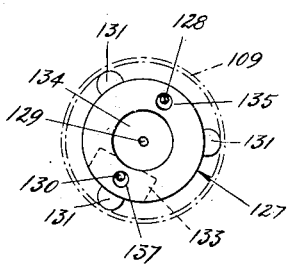

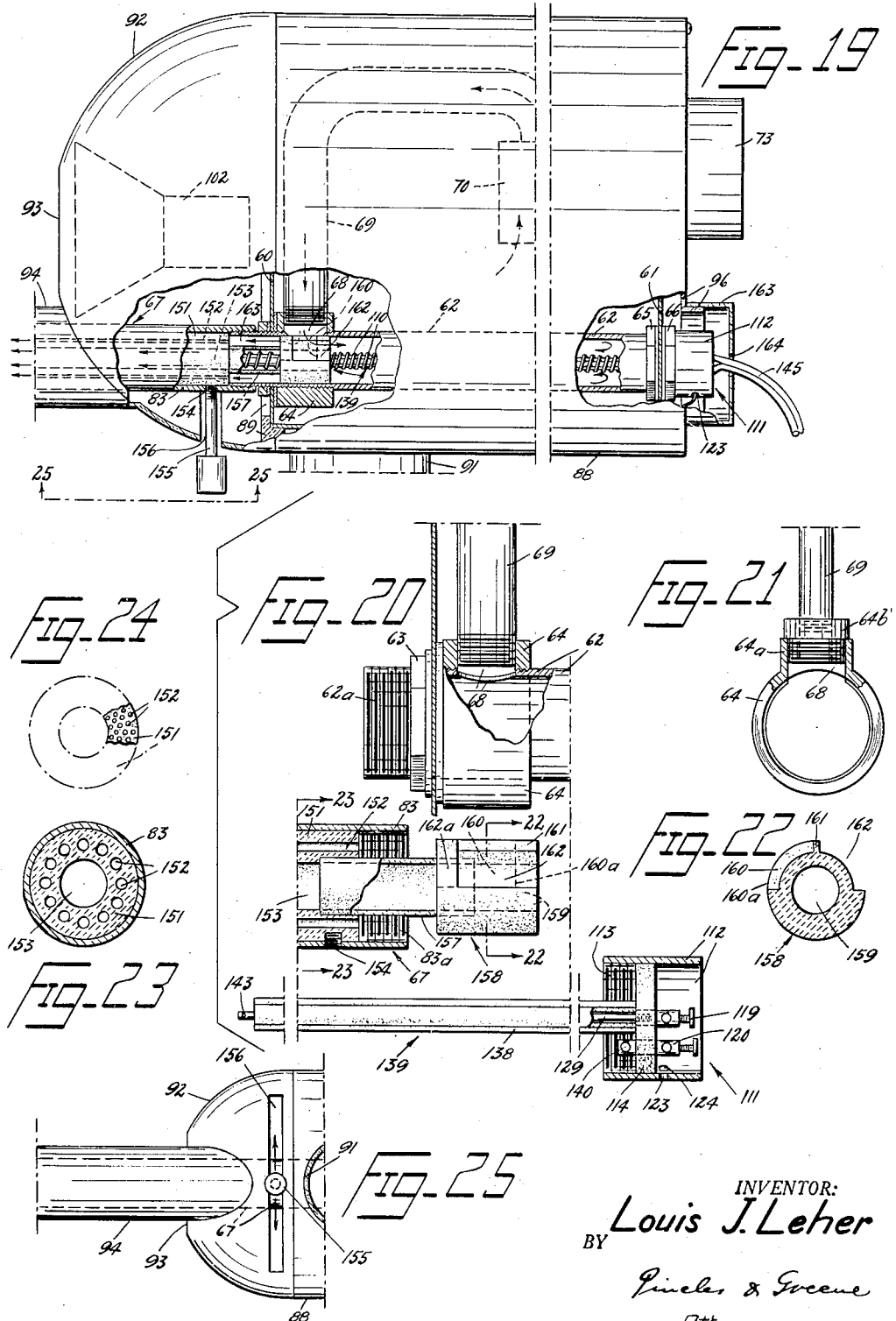

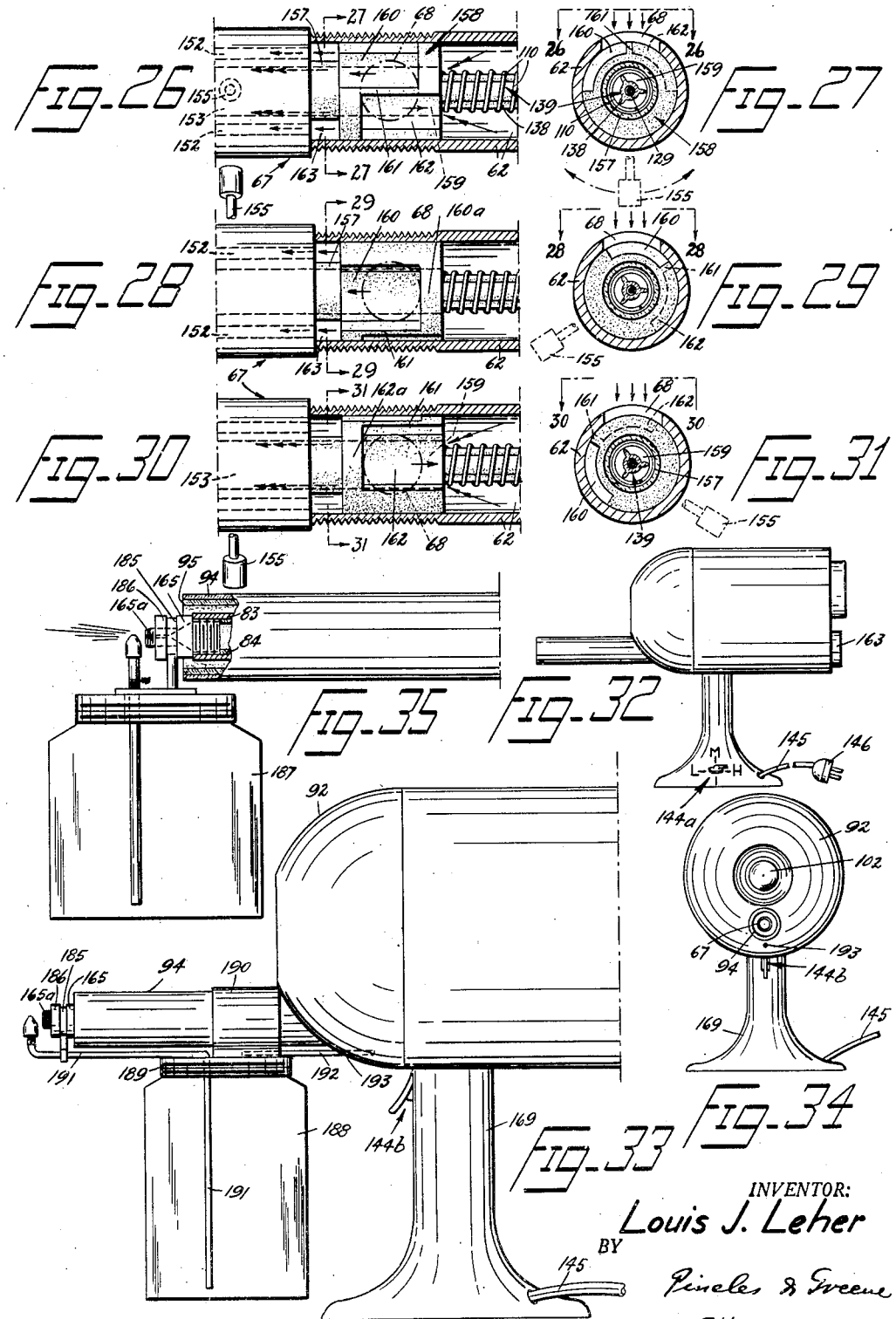

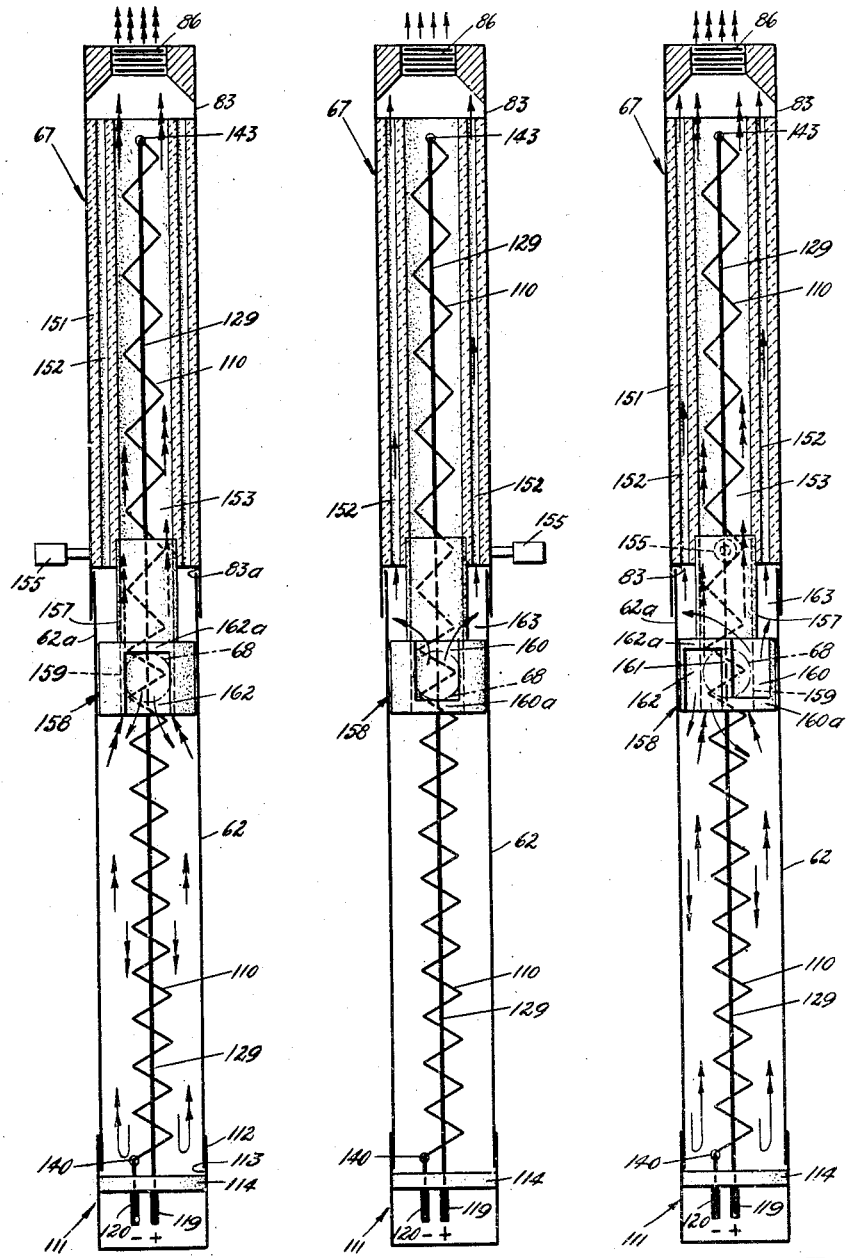

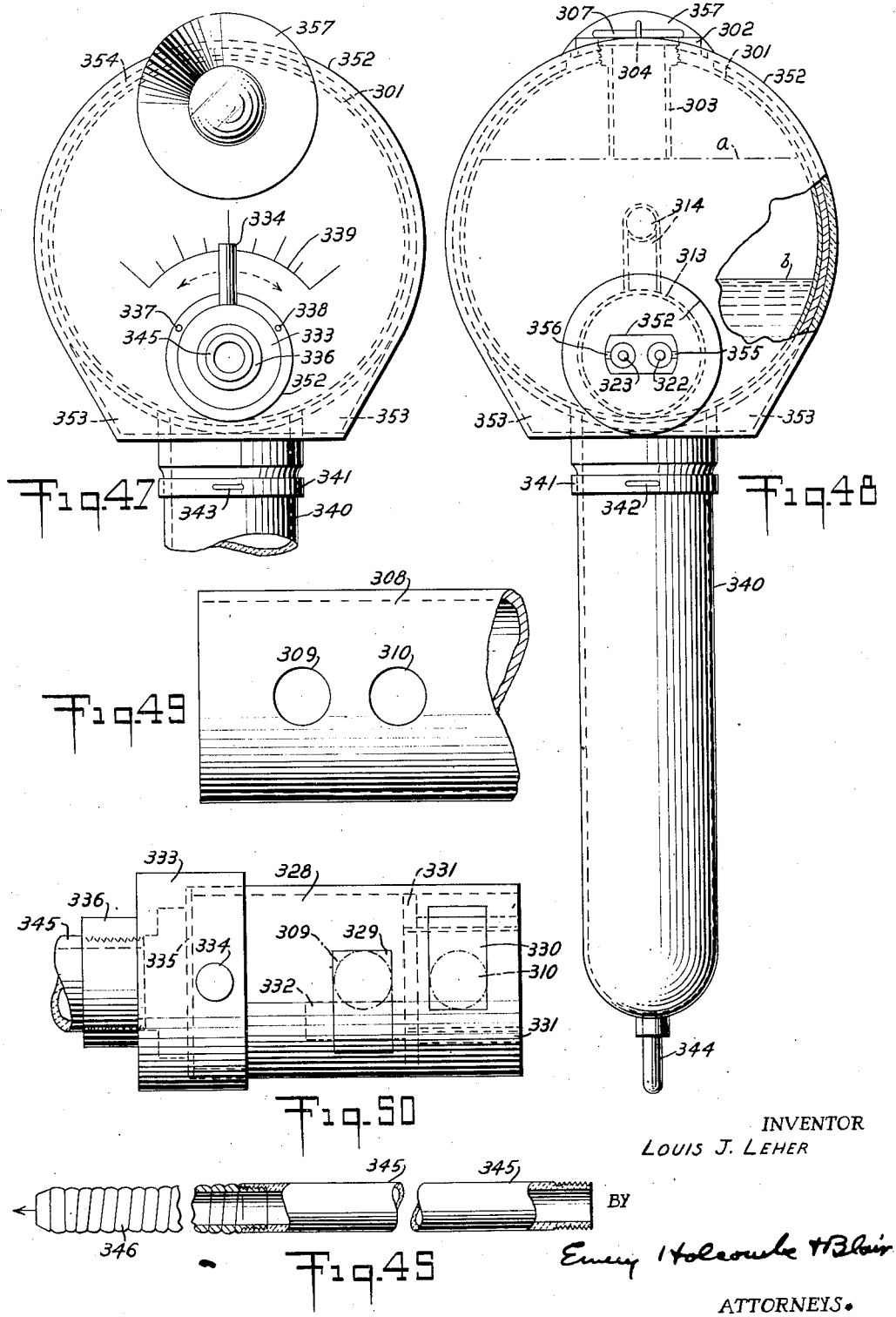

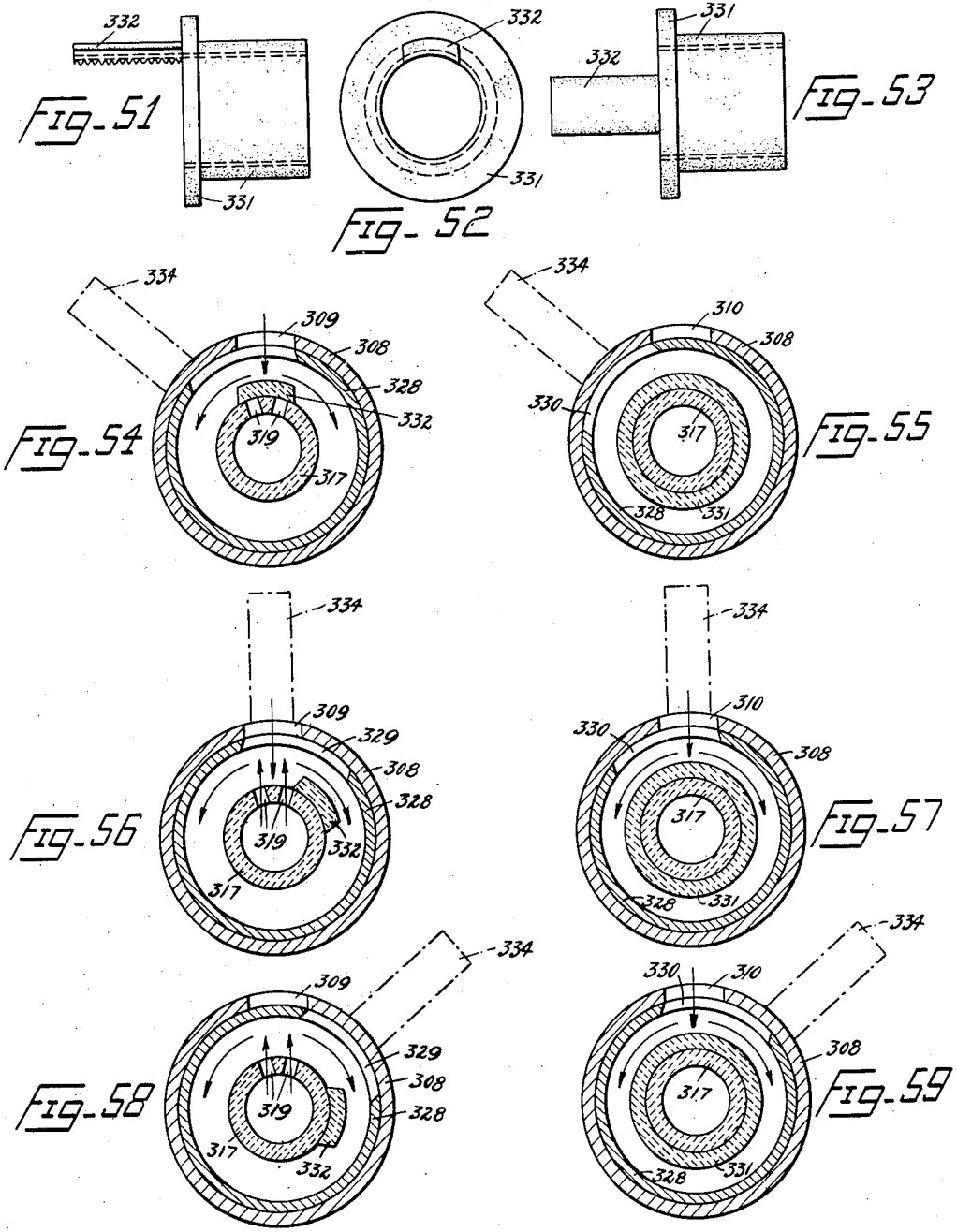

Patented Apr. 19, 1949

2,467,393

UNITED STATES PATENT OFFICE 2,467,393

SUPERHEATING METHOD AND APPARATUS

Louis J. Leher, New York, N. Y., assignor to Steam Torch Corporation, New York, N. Y.

Application June 13, 1945, Serial No. 599,178

13 Claims. (Cl. 219—39)

This invention relates to vapor generating devices, such as steam generators, and more particularly to methods and arrangements for superheating steam or other vapors.

Among the objects of the invention are novel methods and arrangements for supplying superheated steam or other vapor by conducting the steam or vapor over exposed electrically energized resistive conductors located in a duct space which is isolated from the vapor generating space, so as to cause the vapor passing over the exposed electrically heated conductors to absorb a maximum of heat energy radiated directly from the resistive conductors by contact with the bare surface thereof, thereby becoming highly superheated.

The foregoing and other objects of the invention will be best understood from the following description of exemplifications thereof, reference being had to the accompanying drawings, wherein Figs. 1, 2 and 3 are side, front and rear elevational views, respectively, of the portable device, Fig. 1 being partly in section and having parts broken away, Fig. 2 being without the hood-shaped front cover of the boiler housing to show the manner of securing the lamp.

Fig. 4 is an exploded side view of the structure (without the resistor coils) of the three-heat radiation element, being shown partly in section and having parts broken away.

Figs. 4A, 4B and 4C are diagrammatic illustrations of the element showing the three different plug - socket connections ("High," "Medium," "Low," respectively).

Figs. 5 and 6 are front and cross-sectional views, respectively, of the element taken at the planes indicated in Fig. 4.

Fig. 7 is a partly sectioned side view of the contact plug including the cord, which connects the heating element to the wall outlet.

Fig. 8 is a front elevation of the contact plug matching the three-heat terminal arrangement of the heating element shown in Figs. 1, 3 and 4.

Figures 9-12 show a two-heat arrangement of the resistor terminals and contact plugs. Figs. 9 and 10 are front and partly sectioned side views, respectively, of the socket of the element, Figs. 11 and 12 a sectional side view and a front elevation, respectively, of the corresponding contact plug. Figs. 10A and 10B are schematic presentations of the two-heat plug and socket arrangement of the element ("High" and "Medium," respectively). Fig. 10C is a front view of a part of the two-heat element as compared to Fig. 5 showing a similar part of the three-heat element.

Figs. 13-17 are interchangeable nozzle accessories to be attached as needed. Fig. 13 is a flexible extension of the vapor nozzle, Fig. 14 a "crack shooter" for better steam injection into narrow crevices harboring vermin life, Fig. 15 a "vapor spreader" to speed the treatment of large surfaces, especially in connection with paint removing, Fig. 16 an exploded view of the spraying nozzle indicating the manner of attachment, Fig. 17 a partly sectioned side view of a "Bunsen burner" to utilize the apparatus for blow torch purposes.

Fig. 18 indicates an auxiliary container for the spray liquid and is to be attached to the bottom of the handle shown in Fig. 1.

Fig. 19 is a fragmentary side view of another modification of the invention, the portable appliance being shown partly in section and having parts broken away. In this design a one-heat radiation element is employed, the steam heat being regulated by a rotary sleeve valve, the lever of which is in a position corresponding to the detail views of Figs. 26, 27 and 26A.

Fig. 20 is an exploded side view, partly sectioned, of the components of the rotary valve arrangement. The upper portion of Fig. 20 shows the front end of the vapor duct and its communication with the inlet pipe. The middle part of Fig. 20 shows the rear end of the vapor nozzle and the ceramic regulating member extending therefrom. The lower part of Fig. 20 indicates the structure (without the resistor coil) of the one-heat radiation element.

Figure 21 is a partly sectioned front view of a locknut with attached inlet pipe, the junction being somewhat modified from the corresponding side view of Fig. 20, upper part.

Fig. 22 is a sectioned front view of the ceramic regulating member cut at plane 22 of Fig. 20, center part.

Fig. 23 is a cross section of the vapor nozzle as seen from plane 23 of Fig. 20, center part.

Fig. 24 is a fragmentary front view of a ceramic multihole tube forming the inner part of the vapor nozzle as shown in Fig. 23 but having a much greater number of very fine conduits.

Fig. 25 is a bottom view of the front part of the apparatus as seen from plane 25 of Fig. 19, showing the slot in the casing to allow movement of the valve lever.

Figs. 26-31 are partly sectioned details of the rotary valve in operation, the arrows indicating the steam flow. Figs. 26, 28 and 30 are top views of the regulating member in a center, starting and end position, respectively. Figs. 27, 29 and 31 are corresponding front views of the regulating member and associated stationary parts, the drawings showing cross reference as to plane from which the views are taken. Figs. 26A, 28A and 30A illustrate the whole assembly of vapor conduits and radiation element in a diagrammatic form, the rotary valve, which regulates the steam flow as indicated, being in a position corresponding to Figs. 26, 28 and 30, respectively.

Fig. 32 is a total side view on a smaller scale of the apparatus in a modification employing the hollow handle as seat of a three-heat switch.

Fig. 33 illustrates another modification of the switch as well as of the spraying arrangement.

Fig. 34 is a front view on a smaller scale of the apparatus according to Fig. 33, showing the two-heat trigger switch but not the spraying equipment.

Fig. 35 is a partly sectioned side view of the vapor nozzle with attached spraying accessory designed for small jobs only.

Figs. 36 and 37 are a partly sectioned side view and an elevational rear view, respectively, of a funnel-like modification of the filler cap allowing instant tanking and initial water level control through its safety valve mechanism. In Fig. 36 the safety valve is held in an open position, in Fig. 37 it is closed, both figures showing also part of the apparatus.

Fig. 38 is a diagrammatic presentation of a power plant employing a radiant superheater based on my method of electric superheating.

Figs. 39 and 40 are partial views of an electric superheater for large scale operations, Fig. 39 being a cross section and Fig. 40 a partly sectioned side view to illustrate one form of securing the metallic resistor strips inside the superheater.

Fig. 41 is an elevational front view of another form of construction, the insulating wall being removed and a part of the front head broken away to show the porcelain bushings supporting the helically coiled radiation element.

Figs. 42 and 43 depict the shape and the manner of installation of a rod-type radiation element made from silicon carbide or from graphite, Fig. 42 being a partly sectioned rear view and Fig. 43 being an elevational side view of the superheater drawn to half the scale of Fig. 42.

Fig. 44 is a sectional view of a hand portable vaporizer and superheater exemplifying another form of the invention, the terminal prongs 322 and 323 of the radiation element being shown, for better illustration of the wire connections, in a vertical position and the handle 334 of the rotary valve being shown in the extreme left hand position corresponding to the detail views of Figs. 54 and 55.

Fig. 45 depicts the partly flexible vapor nozzle for this device, being shown separately therefrom, and portions of it being broken away.

Fig. 46 is a diagrammatic sectional view of a spraying accessory for the apparatus, which may be attached thereto instead of the vapor nozzle of Fig. 45, when desired.

Fig. 47 is a front elevational view of the apparatus, part of the handle being broken away, and valve lever 334 being in the center position corresponding to the detail views of Figs. 50, 56 and 57.

Fig. 48 is a rear view of the combination sprayer, vaporizer and superheater, the terminals 222 and 223 now being in their normal position.

Fig. 49 is a fragmentary detail of a tubular vapor duct employed in my appliance.

Fig. 50 shows a rotary sleeve valve, normally inserted into the front end of the vapor duct, shown in Fig. 49.

Figs. 51, 52 and 53 are side, front and top views of an inside member secured in said sleeve valve.

Fig. 54 is a sectional detail showing a starting position of the sleeve valve and its inside member, shown in Figs. 51-53, with respect to the stationary vapor duct of Fig. 49 and the stationary insulation pipe or refractory tube 317, the section being taken on the line 54—54 of Fig. 44.

Fig. 55 is a similar detail sectional view for the same parts, in the same initial position, the section being taken on the line 55—55 of Fig. 44.

Figs. 56 and 57 are similar sectional views showing the rotary valve and associated parts in a center position, which compares with the Figs. 47 and 50, while Figs. 58 and 59 are two other similar views showing the movable parts in a final position.

The planes 54—54 and 55—55 of Fig. 44 apply to the sectional detail views 54, 56, 58 and 55, 57 and 59, respectively.

Many attempts have been made in the past to destroy house insects by application of steam heat, but without any practical success. A few of the technical reasons for the prior difficulties confronting the solution of this problem are of interest.

Saturated steam, which is steam in contact with the boiler water, is water vapor at the lowest temperature under a given pressure. At atmospheric pressure it has a temperature of 212° F. and with the slightest drop of the temperature the steam condenses and turns into water. Such immediate condensation of steam caused dripping of the discharge nozzle and a very wet contact with the treated objects, the heat loss being so quick that it failed to destroy vermin life hidden in the deeper cracks.

Attempts to generate in portable devices dry steam of considerably higher temperature likewise failed. When steam in contact with the boiler water is subjected to additional heat, its elastic force increases at a tremendous rate reaching a pressure of 250 lbs./sq. in. at a temperature of only 401° F. If, on the other hand, steam of 212° F. or ordinary steam at 1 atmosphere, is heated in a separate vessel to, say, 692° F., it exerts only a pressure of 30 lbs./sq. in. or 2 atmospheres. This huge difference is explained by the thermodynamic law that the pressure and temperature of saturated vapors (such as steam over boiling water) are always definitely interrelated, whereas superheated steam, whose properties approximate those of a perfect gas, follows Marriotte's law of gases.

Because of the excessive pressure of saturated steam subjected to additional heat, the manufacturing cost and operating risk of the portable boilers in question proved prohibitive.

Steam before it can be superheated must be isolated from the boiler liquid. Expediencies such as coiled tubing or other surfaces designed to dry and superheat the steam were wholly inadequate because steam at a pressure of only 10 pounds above atmospheric pressure moves at a high velocity through the conduits. With the heretofore employed methods of heat transfer, chiefly by convection and conduction, the steam could not pick up sufficient additional heat.

By the arrangements and methods of the present invention the above shortcomings have been overcome. The steam is taken from off the boiler liquid into separate conduits, which direct the steam flow across the wire convolutions of a properly insulated open radiation element. The invention is based on the discovery that steam or other vapors, when isolated from the boiler space and led in direct contact with electrically energized heat radiating conductors, are instantly superheated to a high temperature without causing undue pressure increase or short circuits.

Heat transmission of the open radiant type is, of course, widely being used in electric devices such as hair driers, space heaters, etc., for the heating of air or other gases. However, never before, to my knowledge, has direct radiant heat been used to superheat vapors. This is probably due to the mistaken notion that the intimate contact of live electric conductors with vapors, which unlike gases, are liquids in aeroform condition, would cause instantaneous short circuit. This, contrary to expectation, is not the case, at least not with normal voltages, even when the surrounding superheater vessel is made of metal.

Radiation is the most efficient means of heat transfer in existence. According to the laws of physics, the rate of energy transfer by radiation increases in proportion to the difference between the fourth powers of the absolute temperatures involved, whereas heat conduction increases only in proportion to the first power, and heat exchange by convection increases slightly more than the first power. Furthermore, the intensity of radiation, or radiant heat, varies inversely as the square of the distance from the radiating surface to the body receiving the radiant heat. Since in devices based on the principles of my invention the vapor is in maximum proximity to the radiating surface of the electric resistive conductors, the rate of heat transfer by radiation is inherently the maximum possible, particularly because vapors absorb radiant energy more effectively than air or similar gases.

Experience with ordinary electrical heating wire indicates that same is less affected by steam than through oxidation in air. However, other types of electrically energized heat generating conductors, such as molded rod-type radiation elements, are suitable for use in arrangements of the invention.

In other words, steam of even low pressure moves at a speed of over 800 feet a second through conduits. Present superheaters, therefore, in order to perform their task, must have a very large heating surface. In power plants this is accomplished by placing a large aggregate of small diameter pipes within the boiler setting. In hand portable vaporizers the problem of producing superheated steam could not be solved in the conventional manner. Coiled tubings, grooves, discs and other superheating surfaces proved wholly inadequate in view of the great speed of steam flow through conduits and the necessary small size and weight of the portable boilers in question. This led to my invention of superheating steam by directing it past and in contact with the wires of an open radiation element placed inside the steam conduits. The steam is thereby instantly and highly superheated. The resistors are less affected by the steam than through oxidation in air. The superheating is so effective that a short radiation coil of only 250 watts placed inside the nozzle of a hand portable apparatus and operated at a temperature at, or below, a dull red heat approximating 800–1000° F., produces gas-like vapor of over 700° F.

In general, the electric radiation heater unit of the superheater arrangement of my invention is so designed that the electric current passing therethrough maintains its exterior radiating surface at a temperature substantially higher, that is about 100–200° F. or more, than the desired temperature of the superheated vapor.

The aforedescribed method of electric superheating enables for the first time the generation of dry and highly superheated low-pressure vapor on a practical basis for domestic utilization. It may very well also open new possibilities in the industrial field wherever a highly efficient electric superheater of vapors is needed.

The principles of the invention will now first be explained in connection with Figs. 1–37 showing a hand portable vaporizer and superheater device exemplifying one application of the invention. Similar reference characters refer to similar parts throughout the aforementioned drawings.

The pistol-like appliance weighs about 1½ pounds and may be comfortably carried and handled by a woman without tiring her. It is to be filled with one drinking cup of liquid, which will boil in a few minutes and last for about half an hour of uninterrupted service at an adequate rate of evaporation.

Though the device has primarily been designed for natural heat treatment purposes by means of dry, low-pressure steam of variable heat degree, it can also be used as alcohol blow torch (Fig. 17) and spray gun (Figs. 1, 16, 18, 33, 35).

The steam heat can be regulated by manual control of a multiheat radiation element (Figs. 1, 3–12) or a rotary valve mixing saturated and superheated steam (Figs. 19–31).

*General construction*

The cylindrical, horizontal boiler 60 (Fig. 1), made of sheet metal, is closed like a paint tin can by pressing in the rear cover 61. Through the lower boiler part passes the tubular vapor duct 62 connected with and reenforcing the boiler ends by locknuts 63—66 or other appropriate means. To the threaded front and rear end of the vapor duct 62 protruding from the boiler heads are attached the screwed fittings 85 and 111 of the vapor nozzle 67 and the electric heating element, respectively, the latter extending through the whole length of the vapor duct 62 and nozzle 67. A hole 68 through the locknut 65 and duct 62 connects the inlet pipe 69 with the interior of the vapor duct 62. The other end of the bent inlet pipe 69 opens in the upper part of the boiler as shown in Fig. 1 and supports a steam dome 70, which permits steam access only through its perforated bottom 71. This arrangement is designed to function as follows:

The apparatus, when filled with a cup of water, may be turned and tilted in any possible direction, even upside down, without the boiler liquid being able to enter the vapor conduits. The water levels in four different 90 degrees positions are of a height indicated by the dot and dash lines 75a, 75b, 75c, 75d. In the center space of the boiler, which always remains free of liquid, is located the perforated steam inlet 71 of the dome 70.

Under normal manipulation of the appliance, steam is always being taken into the conduits from the upper part of the steam space, which is driest and most free of water particles suspended in the steam. The perforations of the dome inlet 71 aid in freeing the steam from water contents caused by ebullition.

The device is filled through a wide aperture 72 in the boiler rear cover 61 and closed by a filler cap 73 of the screw-in type, for instance. The filler cap may be provided with a safety valve 74 and a pipe extension 75, which reaches into the steam space beyond the water-line 75a to prevent the boiler liquid from covering the safety valve outlet in case the apparatus is held in a steep upright position.

The vapor nozzle 67 consists of a metal tube 83, which supports an inner ceramic tubing 84, and is secured to the vapor duct 62 by a screwed fitting 85. The front end of the nozzle is provided with screw threads 86 or other appropriate means to permit quick attachment of the various interchangeable accessories shown in Figs. 13–17.

The boiler 60 and nozzle 67 are surrounded by an insulating casing 87. It may be designed and mounted as indicated in Figs. 1–3, the components being a cylindrical main section 88, a spherical front cover 92 and a flat circular rear cover 96.

The cylindrical main section 88 has two rings 89 and 90 fitted into both ends and a threaded bottom projection 91 to carry the removable, hollow handle 169.

The spherical front cover 92 is attached to the protruding rim 89b of cylinder ring 89 and has a large opening 93 in front of the lamp, and a tubular extension 94, lined with asbestos 95, which encloses the nozzle 67.

The rear cover 96 has two openings 97 and 98 to accommodate the filler cap and the socket of the heating element, respectively, and three pad-like elevations 99, which, when screwed to cylinder ring 90, will hold the boiler inside the flange 89a of cylinder ring 89.

The above assembly firmly secures the boiler 60 within the casing 87 by a minimum of supporting surfaces and leaves sufficient air space on all sides for better insulation and for the enclosure of the lamp 102 and its electric supply wires 103 and 104.

These wires 103, 104 are threaded through two pairs of holes 105, 106 (Fig. 2) and 107, 108 (Fig. 3) in the cylinder rings 89 and 90, respectively, and are connected with the terminal prongs 119, 120 of the heating element by way of two pairs of holes 123, 124 and 125, 126 leading through the socket 111 and the terminal prongs 119, 120, respectively (Figs. 1 and 3).

The reflector lamp 102 inside the dome 92 may be secured by a number of means, one being a pronged box 101 fastened to the cross bar 100, which in turn is held by the cylinder ring 89 (Figs. 1 and 2).

The multiheat radiation element

Originally in my first models I employed a one-heat radiation element such as indicated in Fig. 19. It consisted of ceramic pipelets slipped over a long metallic conductor and supporting a helically coiled resistance wire, which was mounted concentrically into the vapor duct 62. The resistor coil led from the rear end of the apparatus to the tip of the nozzle, the wire section within the duct 62 evaporating the boiler liquid, the other and smaller part of the wire inside the nozzle 67 doing the principal superheating. The superheated vapor was of such high temperature that ways and means of heat regulation had to be devised to provide a wider field of application for the apparatus.

One way of regulating the steam heat is by means of a multiheat radiation element such as shown in Fig. 1 and diagrammatically in Figs. 4A, 4B, 4C. The element consists of two resistor coils 109 and 110, which are interconnected and whose common terminals 118–120 permit the system to carry three different loads, thereby varying the heat of the steam discharge or the rate of evaporation as will be explained hereinafter.

The supporting structure (Fig. 4) is composed of two ceramic tubings 127 and 139, three metallic conductors 128–130 and a threaded socket 111, which secures the element in a concentric position within the vapor duct 62 and nozzle 67.

The element is built along the following principles (Fig. 4): In a metallic cylinder 112, threaded at 113 to fit to the protruding rear end of vapor duct 62, is firmly embedded a round ceramic terminal block 114 having a shoulder 121 and three outlets 115–117, which are so positioned as to match the triangular arrangement of the tracts 135–137 of the ceramic tubing 127 as shown in Fig. 5. Into these three holes 115–117 are cemented the metallic terminal prongs 118–120 after same have been fastened to the steel rods 128–130. The refractory tube 127, by way of its tracts 135–137, is then pushed over the steel rods and cemented into the shoulder 121 of the terminal block 114, leaving open only the passage 133 into the large inner channel 134 of said ceramic tube. After bending the steel rod 129 at point 141 to fit concentrically into the nozzle 67, a single hole ceramic rod 139 is added to the structure, which is now ready for wiring.

Resistor coil 109 is pushed over refractory tube 127 and attached to the steel rods 129 and 130 at their exposed middle and end points 141 and 140, respectively (Figs. 1, 4, 4A). Resistor coil 110 is distributed over the refractory rod 139 and connected to the steel rods 128 and 129 by means of the small holes 142 and 143 through the protruding front ends of said steel rods.

The refractory member 127 used in the device shown in Fig. 1 was a commercially available refractory tube, and although a part of the steam was passing through its interior, the device was nevertheless very effective in delivering superheated steam when operated in the manner described hereafter. Obviously, by using a solid refractory member, all the steam entering the inlet side of the duct 62, in which the refractory member 127 with its heater coil are located, is forced to flow along the electrically heated resistance element so as to be heated by the radiant energy therefrom.

The extruded single hole rod 139 and four-hole tube 127 have an edged outside shape resembling Figs. 5 and 6. The elevations 138 and 131, respectively, hold the wire coils firmly in place while permitting a maximum of radiation. The single hole rod 139, supported by the resilient steel rod 129, may rest at the bottom surface of nozzle channel 67 or it may be propped up to a concentric position by a few pins 138a (Fig. 1) or similar means of support affixed to the rod after wiring.

The ceramic ring bushing 122, which is attached to the shoulder 121 of the terminal block 114, protects the resistance wire from possible water slugs. The ceramic bead 132 (Fig. 4) prevents possible short circuit between the exposed front and middle section of the steel rods 128 and 129, respectively.

The element after insertion into the apparatus is actuated by a long cord 145, whose contact plugs 146 and 147 at either end (Fig. 7) connect the terminal prongs 118–120 with the electric wall outlet (not shown). The cord is attached to the three metallic terminal sleeves 148–150 of plug 147 as indicated in Figs. 7 and 4A, 4B and 4C.

Because of the identical triangular arrangement of the terminal prongs 118–120 and terminal sleeves 148–150 (Figs. 3 and 8), plug 147 can be attached to the socket 111 of the heating element in three different ways. Furthermore, due to the different length of said terminal prongs and sleeves—the terminals 118, 119 and the sleeve 150 being short, the terminal 120 and sleeves 148, 149 being long—manual three-heat control of the element is effected as follows:

"Medium" (Fig. 4B—one circuit only): The heating unit is so connected that the short terminal 118 and the short sleeve 150 do not contact and the circuit 120—140—141—119 is being closed by the two long sleeves 149, 148 of plug 147. This plug position is used to start the boiler, as only the resistor coil 109 inside the vapor duct 62 is in operation. The steam flowing therethrough is sufficiently superheated by the wire convolutions 109 to emerge from the long, exposed flexible nozzle of Fig. 13 in a completely dry state slightly above saturation temperature. Superheating inside the duct 62 is not as pronounced as inside the nozzle 67 because part of the radiant heat is absorbed by the boiler and by the greater amount of moisture being eliminated from the steam coming directly from the boiler. Besides, part of the vapor flow (indicated by arrows, Fig. 1) passes without contacting the wire by way of the inner channel 134 of refractory tube 127 into the nozzle 67. The same plug position serves also for spraying and blow torch purposes. It produces a large alcohol flame.

"High" (Fig. 4A—two circuits in parallel): If highly superheated steam is desired, plug 147 is switched to a position, which connects all three terminal prongs and sleeves with each other, namely the two short terminals 118, 119 with the two long sleeves 148, 149 and the long terminal 120 with the short sleeve 150. In this case the heating wire 110 inside the nozzle 67 is included in the operation of the element, which now forms two circuits 119—141—140—120 and 119—143—142—118. The steam, which has been dried and slightly superheated in the vapor duct 62, flows through the narrow confinement of nozzle 67 past the convolutions of the resistor coil 110 and emerges in a gaseous state of extreme superheat degree.

"Low" (Fig. 4C—two circuits in series): In this position the short terminal sleeve 150 does not contact the short terminal prong 119. The electric current flows through both resistance wires 110 and 109 between two poles only (149, 148), the series circuits being 118—142—143 and 141—140—120. If the two resistor coils 109 and 110 produce in parallel, say, 440 watts and 220 watts, respectively, or a combined total of 660 watts for superheating purposes, they generate in series only a fourth of said total wattage or approximately 147 watts, of which, roughly, 98 watts apply to the boiler. This small wattage may serve for evaporating volatile liquids like alcohol. The reduced rate of evaporation produces a small alcohol flame.

Except for the aforementioned blow torch features, a two-heat element will do for all purposes of the apparatus. The front and side views of Figs. 9–12 and the diagrammatic views of Figs. 10A, 10B illustrate the construction and operation of a two-heat plug and socket arrangement. The only difference in construction as compared to the three-heat design is the straight alinement of the three terminal prongs 118–120 and the three terminal sleeves 148–150 of the socket 111 and the contact plug 147, respectively. The holes 115–117 in the terminal block 114 will of course be similarly arranged and the ceramic tube 127 (Fig. 10C vs. Fig. 5) will have only two side tracts 135 and 137 for the steel rods 128 and 130. The steel rod 129 will pass concentrically through the wide inner channel 134 of said tubing and needs now no bending at point 141 (Fig. 4) to fit perfectly into the nozzle 67.

Heat regulation is performed by simply turning around the flat, rectangular contact plug 147 (Figs. 11, 12). "Medium heat" connection (Figs. 10B) establishes contact between the two long terminal prongs 119, 120 and terminal sleeves 149, 148, the short terminal prong and sleeve 118 and 150, respectively, not touching each other. A double circuit in parallel and therefore superheating of the vapor inside the nozzle is brought about by connecting all three terminal prongs and sleeves as shown in Figs. 10, 11, 10A.

The plug and socket arrangements heretofore described may of course be replaced by a switch of appropriate design. Both the three-heat switch 144a of Fig. 32 and the two-heat trigger switch 144b of Figs. 33, 34 are installed in the handle, which then is not removable to serve as container for the spray liquid. The trigger switch 144b operates at "high" when pressed in; it returns, when released, by spring action to its normal "medium heat" position.

In order to facilitate the practice of the invention and without in any way limiting its scope, there are given below the principle data of a model of a device similar to that shown in Fig. 1 which was built out of parts commercially procurable in electrical supply stores:

A boiler vessel 60 was made of a one-quart used paint tin can with a press-in cover of the type shown, the can having a diameter of 4½" and a length of 4⅞".

The inlet pipe 69 was a ¼" brass tube.

The vapor duct 62 was a brass pipe having an outside diameter of ⅞" and an inside diameter of 13/16".

The refractory tube 127 had an outside diameter of 17/32" and was formed of ceramic material sold by the American Lava Co. under the name AlSiMag 35.

The hollow rod 139 for the heating element 110 had an outside diameter of 5/32" and an inner diameter of 5/64", and was 6¼" long and was made of the same ceramic material.

The inner nozzle tube 84 had an inside diameter of 5/16" and was made of the same ceramic material.

The resistance element 109 was formed of a ribbon about 10 feet long of a resistance alloy metal which consumed about 250 watts at about 110 volts and operated at a dull red heat of about 800° F. to 1000° F.

The resistance element 110 was formed of a wire of a resistance alloy metal about 14 feet long wound in about 300 convolutions. It consumed about 250 watts at 110 volts and operated at approximately the same temperature.

When the device operates with only heating element 109 connected, the steam delivered by duct 62 to the outlet nozzle 67 is already superheated and has a temperature of about 400° F.

When both heating elements 109 and 110 are each fully energized from a 110 volt source, the steam delivered at the outlet nozzle opening 86 has a temperature well over 700° F.

*Temperature control by rotary valve*

The steam temperature can also be regulated by means of a manually controlled rotary sleeve valve, which permits either a saturated or a highly superheated vapor discharge or mixes saturated and superheated steam to a desired heat and humidity degree. The principles of construction and operation involved in such exemplification of the invention are outlined in Figs. 19–31.

Comparing Fig. 19 with Fig. 1, it will be seen that the steam from the upper boiler space is now conducted into the front end of vapor duct 62, the inlet pipe 69 and the hole 68 through locknut 64 and duct 62 being of a somewhat larger diameter. The junction, shown more clearly in Fig. 20, upper part, may be modified as indicated in the detail view of Fig. 21. The locknut 64 is then of ordinary thickness, but has a tapped boss 64a carrying the reducing coupling 64b, which links the inlet pipe 69 with the interior of vapor duct 62.

Fig. 20, center part, represents a sectioned end view of the modified construction of vapor nozzle 67. A pipe 83, threaded at 83a, encloses a multihole tubing 151, which is firmly connected with the rotary member 158 by means of a short tubing 157. All parts except the metallic pipe 83 are made of ceramic material.

The rotary member 158 has two longitudinal cavities 160 and 162, subsequently called windows, which resemble two short dead-end channels cut out from the side of the tubular body in a parallel but opposing direction. Each window is defined by a back wall 160a and 162a, respectively, and a separating side wall 161, as is clearly visible in Figs. 22, 26, 26A. The tubular body is of smooth surface and fits closely into the vapor duct 62. It projects from the vapor nozzle 67 to a point commensurate with the assembly view of Fig. 19, which shows the location of the rotary member with respect to the vapor outlet 68.

The construction of the one-heat radiation element (Fig. 20, bottom part) is self-explanatory after the previous comments in connection with Fig. 4. The element is simply an elongation of the single hole rod 139 extending through the whole length of vapor nozzle 67 and duct 62 and resting inside the channel 153—159 of the aforementioned ceramic parts 151, 157, 158 (Figs. 26A, 19, 20).

An insulated lever 155 is fastened to the vapor nozzle 67 at point 154 (Fig. 19). This lever, which protrudes from a slot 156 in the casing 92 near the handle, permits rotation of the vapor nozzle 67 around the threaded duct end 62a within the limit of said slot 156.

By shifting the lever 155, an identical circular movement of the rotary member 158 inside the duct 62 causes the two windows 160, 162 to communicate with the vapor outlet 68 in a manner, which varies the direction of the steam flow and thereby its properties as follows:

Lever 155 in left corner of slot 156 (Figures 30A, 30, 31): In this valve position, only the window 162, which leads into the duct 62, is in communication with the vapor inlet 68. The vapor fills the duct 62 and escapes through the inner channel 159—153 of rotary member 158 and nozzle 67 by passing in close proximity the wires of the radiation element enclosed in said channel. The steam discharge will be gaseous and of maximum superheat degree to be used for paint removing, sterilizing utensils, airifying deodorants and germicides, etc.

Lever 155 in right corner of slot 156 (Figs. 28A, 28, 29): Now only the window 160 of rotary member 158 communicates with the vapor inlet 68 and releases all steam by way of the intermediate duct space 163 into the plurality of narrow canals 152, which pass in a circular arrangement (Fig. 23) through the outer part of the ceramic tubing 151 of nozzle 67. The vapor discharge will be saturated and of ordinary boiling temperature to serve for steaming and freshening up plushes, disinfecting sickroom beddings, exterminating bedbugs and moth larvae, inhaling vaporized medications, etc. If the outer passages 152 of the extruded tubing 151 are as small and numerous as indicated in Fig. 24, the steam will be very dry and superheated to some degree.

Lever 155 in the middle of slot 156 (Figs. 26A, 26, 27): Both windows 160, 162 communicate with vapor inlet 68 and direct the steam flow in equal proportion both into the outer nozzle canals 152 and into the inner nozzle channel 153 by way of duct 62. The resulting steam outflow will be of medium superheat degree, which can be increased or decreased according to requirement by moving valve lever 155 to a position between the center and the two ends of slot 156.

According to Figs. 26A, 28A and 30A, the ceramic tubing 151 of nozzle 67 will be a little shorter than the metallic outside pipe 83 to provide space for mixing the varying volume of saturated and superheated steam before it leaves the nozzle. The nozzle tip will be threaded at 86 to receive the various interchangeable accessories of Figs. 13–17.

To facilitate the explanation of the steam flow conditions for different positions of the rotary valve arrangement, Figs. 26, 28 and 30 and the corresponding diagrammatic Figs. 26A, 28A and 30A show by single-head arrows the directions of flow of saturated steam, by double-head arrows the directions of flow of medium superheated steam, and by triple-head arrows the directions of flow of the highly superheated steam.

In order not to overheat the nozzle 67, the resistor coil 110 of the one-heat element will be so distributed over the ceramic rod 139 that the larger part of the wire is located inside the duct 62 as intimated in Figs. 19, 26A. The screwed fitting 111 of the element may be covered by a detachable box 163 having a hole 164 for the cord 145 (Fig. 19).

The rotary valve arrangement may of course also be used in combination with a multiheat element regulable by contact plug 147 as indicated in Fig. 1.

Said control plug permits: starting the boiler without simultaneously heating the nozzle while no steam passes through it; immediate disconnection of the apparatus without referring to the electric wall outlet; "low heat" connection to generate a small alcohol flame.

The rotary valve has the additional advantages of instantaneous and very close heat and humidity control of the steam discharge within a wide range of requirements, which is of value for exterminating work and with regard to paint removing, etc. It also permits that vapors may be generated and discharged without flowing through the conduits containing the open radiation element.

Blow torch and spraying accessories

By tanking the apparatus with ordinary alcohol, which is a non-explosive liquid, and igniting the generated vapor at the nozzle tip, a large blue flame is obtained if the "Bunsen burner" shown in Fig. 17 has been attached.

The burner consists of a short, interchangeable nozzle 166 having a threaded nose 166a, to which a thin, metallic cylinder 167 is secured by means of a tapped pipelet 168. Said cylinder and pipelet have air holes 167a and 168a, respectively, as indicated.

If the nozzle 166 is replaced by the identically shaped spray nozzle 165 (Fig. 16), which has a much smaller orifice, and the element is switched to "low," the resulting flame will be short and pointed.

Spraying by means of the elastic force of vapor requires a somewhat stronger boiler construction and a tightly fitting filler cap 73 provided with a simple safety valve 74 such as shown in Fig. 1 or Figs. 36, 37.

The spraying auxiliaries may be designed in a number of ways:

Figs. 1 and 35 show two arrangements designed for small spraying jobs only. If, according to Fig. 1, the detachable, hollow handle 169 is to be used as container for the spray liquid, the socket or switch of the electric element must of course be located at the boiler end below the filler cap.

The arrangements of Figs. 1, 18 and 33, 34 will allow also professional use. In both constructions the larger quantity and weight of the spray liquid is well balanced with respect to the handle 169. The necessary boiler pressure can safely be obtained in a shell of such small diameter as that of my portable appliance. Besides, the safety valve will assure a reliable pressure limit for all contingencies of operation.

Referring now to Fig. 1, the hollow handle 169 is detachable at 170 from the threaded bottom projection 91 of the boiler housing 87. The brass conduit 175 is built in as shown. It is firmly cemented into the three holes 176–178 of the insulation casing.

The short pipe section 179 serves in place of a trigger to enable prompt interruption of the spraying process. When, while holding the apparatus, the tiny opening 180 of said branch pipelet is closed by the tip of the forefinger, the velocity of steam discharged through narrow orifice produces sufficient suction to carry the liquid inside the handle to the spray nozzle 165 (Fig. 16) attached to the vapor nozzle 67 at 86. Removing the finger tip from the hole 180 will instantly stop spraying.

The handle 169 may have a more extensive bulge at 169a than shown in Fig. 1, in which case, because of the comparatively large bottom area, it will hold much more liquid than is apparent at first glance. The flexible tubing 181 prolonging the conduit 175 and having a weighted end 182 follows the movement of the spray liquid inside the handle and will drain off practically all of its contents regardless of the operating position of the apparatus.

If the handle has a detachable base 171, spraying capacity can greatly be augmented by means of the spacious container 172 (Fig. 18), whose male threads 173 fit the female threads 174 of the handle bottom. The flexible tubing 181 will then extend into said container 172.

Connection with the spray nozzle 165 at the other end of conduit 175 is established as indicated in Fig. 16. After the spray nozzle has been screwed to the vapor nozzle, pipelet 183, having an adjustable outlet 184, is pushed over the bent-up end 175a of tubing 175. At the same time the ring 185 forming a fixed union with pipelet 183 is pushed over the threaded nozzle nose 165a and then firmly secured by a locknut 186. The completed connection is illustrated in Figs. 35 and 33.

These drawings, which are self-explaining, show also two modifications of the spraying arrangement as compared with Fig. 1. The arrangements permit spraying without conduits as fixed part of the apparatus. The brass conduits are now part of the separate containers 187 or 188, respectively, the handle being used as seat for the switch connecting the heating element and the lamp with the cord 145.

The large jar 188 of Fig. 33 is threefold secured. Its weight inclusive of the spray liquid is carried by the strong, cylindrical ring 190, which fits closely the tubular cover 94 of the vapor nozzle. The jar cannot slide forward because of the pipe 191 being attached to the spray nozzle as described above. The container can also not swing sidewise due to the rigid metallic rod 192, which extends through the hole 193 (Fig. 34) into the spherical front head 92 of the boiler casing.

Only three motions are necessary to mount the spraying equipment to the apparatus: Attaching nozzle 165; pushing simultaneously ring 190 over insulation tube 94, rod 192 into hole 193, ring 185 over nozzle nose 165a; tightening locknut 186.

Refilling the jar 188, which can be unscrewed from its cover 189, does not disturb the mounting. Spraying may be interrupted by means of a suitable trigger (not shown) or by disconnecting the heating element or by relieving vapor pressure through the safety valve, if same is designed to be opened manually like in Figs. 36, 37.

These two detail views, compared with Fig. 1, show a modified form of the filler cap 73. Its funnel-like body, spun from thin metal sheet, has a conical end section 76 terminating in the safety valve 74, screw threads 77 fitting the flanged boiler opening 72 and a cylindrical front section 78 provided with two incisions 79, 80. An insulated handle bar 81, connected with the long safety valve pin 82, rests normally inside said cuts 79, 80, in which case the safety valve is closed (Fig. 37). By pulling out the handle bar 81 and resting it, after a slight twist, against the edge of cylinder 78, the safety valve 74 is held in an open position (Fig. 36), which permits instant filling and refilling of the boiler without removing the filler cap 73. Furthermore, no cup or drinking glass is needed as measure for a correct initial water contents to assure satisfactory boiler performance at full liberty of movement during operation. The appliance is held right to the faucet and after tanking, while the safety valve is still open, turned 180° to release all liquid in excess of water-line 75a (Fig. 36). This establishes the proper water level for all possible boiler positions. Only for rinsing the boiler after operation has the filler cap 73 to be removed. The handle bar 81 protruding from the cuts 79, 80 allows a good grip and therefore a tight closing and easy opening of the boiler.

Household and workshop uses

The devices of the invention of the type shown in Figs. 1–37 and 44–59 constitute a new kind of domestic appliance performing a variety of functions, which heretofore have not been combined in one apparatus. These functions and some of their practical applications are as follows:

I. Vaporizing water or other liquids enclosed in its manoeuverable boiler to a very dry state of low pressure. These saturated vapors can be utilized for steaming to freshen up materials like plushes, velvets, furs, veils, etc., while sterilizing them at the same time, disinfesting upholstery, woolens, etc., disinfecting sickroom beddings, mattresses, comfortables, pillows and such, inhaling, etc.

II. Superheating the vapors generated in the small appliance to a gas-like state of a desired temperature above the boiling point. Such high-temperature "gas" may be applied for exterminating vermin life hidden in cracks and crevices, etc., sterilizing utensils, instruments, receptacles, game before skinning, meat blocks, etc., removing, without injuring the object, old paint or other finish from walls and furniture; acids, oil and grease from tiny watchmakers' parts or other articles difficult to clean by hand; putty from window panes, etc., air-purifying by means of gasified deodorants and germicides, etc.

III. Serving as powerful alcohol blow torch for soldering, unfreezing pipes and miscellaneous jobs in and around the house.

IV. Atomizing liquids, contained in the detachable hollow handle or in an auxiliary vessel attached to the appliance, by means of the elastic force of steam or other vapors produced within its boiler vessel. Even inflammable liquids may be sprayed through the agency of vapors, their saturation temperature at the required pressure being below the ignition temperature of most of these liquids. (Large steam boilers with oil spray burners, for instance, often atomize their fuel by means of steam.)

*Electric superheating for industrial use*

The advantages secured through the use of superheated steam in power plants are well known.

Present superheaters are placed within the boiler setting in such a way that the products of combustion for generating saturated steam are also utilized for superheating the generated saturated steam. There are conditions, however, under which the installation of such a superheater is in no way advisable. Factors such as the initial cost and the upkeep of the superheater, inefficient design due to lack of space within the boiler setting, possible operating difficulties, a regard of pipes and fittings, and the like, may offset the advantages gained through the use of superheated steam. It is also true that where a definite weight of steam is to be superheated, an added amount of fuel must be burned. The increase in fuel consumption will be approximately 11 per cent for 200 degrees of superheat.

According to the invention, the principles of electric superheating arrangements described above in connection with portable devices are also applied to steam generating systems in power plants. Fig. 38 shows in a schematic manner a steam generating system of a power plant exemplifying the principles of the invention. It has a boiler 200, a steam main 201, a turbine 206, an electric superheater 203 with terminals 219, 220, power circuit 221, control panel (rear view) 222, control circuits 223 and a hand-operated switch 224.

The superheater is connected with the steam main near the turbine. The steam flow can be detoured through pipe 205 by means of the two valves 202, 204, which permits easy access to the superheater for maintenance work.

The superheater is also provided with a thermostat controller 225 and a temperature-limit fuse 227, which are mounted as indicated in Fig. 39. For the sake of simplicity, the thermostat controller 225 is shown actuated by a Bourdon tube extending from the steam space of the superheater and operating a voltage regulator 226 which raises or lowers the voltage impressed on the heating element or elements so that the heat generated equals the heat absorbed by the steam flow. The temperature is thereby held within a desired value. In case the thermostat controller should fail, protective means indicated by the temperature-limit fuse 227 will actuate a circuit breaker 228.

The superheater 203 itself can be constructed in various ways, one arrangement being indicated in Figs. 39-41. A strong metallic cylinder 208, covered by a substantial insulating wall 207 and the inside surface being lined with a suitable ceramic material 209, is closed at either end by a steel head 208a (Fig. 41) having a flange 208b for coupling the superheater with the steam main 201 as indicated in Fig. 43.

The ceramic lining 209 is glazed and highly polished or specially coated so as to reflect most of the radiant energy for complete absorption by the steam flow. The arrows in Figs. 39 and 40 indicate the radiant reflection and the steam flow, respectively.

The heavy resistor heating elements inside the superheater are spaced and separated from the tube by porcelain supports of varying design.

These supports may be bushings individually secured to the cylinder 208 or, as shown in Figs. 39, 40, perforated insulating bars 210 held in place by screws 212 or other suitable means. The flat metal strips 215 of the radiation elements are wound either helically or back and forth in a sinuous form through the holes 211 of the insulating bars.

Another construction is the use of stay shafts 213 extending through the superheater and secured at both ends to the cylinder heads 208a as indicated in Fig. 41. The ceramic shoulder bushings 214 assembled on these shafts hold the helically coiled resistor element 215 in a suspended position inside the superheater tube.

Still simpler is the mounting of a rod-type radiation element (Figs. 42, 43). Such an element is made from silicon carbide or graphite and takes the form of a straight rod. The rod element 216 is clamped between strong terminal arms 217, 218 and is otherwise self-supporting. It may be pierced by a plurality of channels 216a in order to enlarge the radiating surface. Uniform heat distribution is obtained by placing the element off center into the superheater tube. The element may be operated at temperatures above 2000° F. to serve special purposes in the chemical industries.

In order to achieve best results with a minimum of radiated energy, the saturated steam entering an electric superheater of the invention should, of course, be as dry as possible. If the steam main is long and condensation excessive, a unit 201a (Fig. 38) designed to eliminate most of the water carried by the steam should precede the superheater. Such a unit may be any kind of water trap, drier or preheater. Much better, however, is to install in an extended pipe system at some point between the boiler and the superheater near the engine a preliminary radiant superheater of the electric type just discussed having a wattage just sufficient to keep the steam flow until it reaches the main superheater in a completely dry or adequately superheated state.

The practical aspects of an electric superheater applying the principles of the invention on an industrial basis may be summarized as follows:

The initial cost will be very low due to the simple construction and small size of such a superheater. It needs practically no attention, is not subject to a large upkeep cost or depreciation and can be repaired without in any way interfering with the operation of the boiler.

An electric superheater of my invention can be connected anywhere to the piping system for drying and superheating the steam flow. It can be installed right at the point of steam utilization. It can be made direct part of any type of vapor engine that transforms heat into work.

It permits instant and close heat regulation of the steam flow by means of an automatic or hand-operated switch arrangement. The attainable ultimate superheat degree is limited only by the operating temperature designed for the electric elements.

It is practically indestructible and can be built to withstand extreme conditions of heat or chemical reaction.

It can be disconnected at convenience without any danger of burning as is now the case with the large pipe layout of superheaters operated by the same products of combustion that keep the boiler under pressure.

It is a natural auxiliary to electric vapor generators of all types, which at present have no superheating facilities.

An electric superheater of the invention may easily be combined with non-electric boilers having no superheater or in place of or as addition to existing superheaters, particularly where lack of space requires an efficient superheater of very small size or where temporarily, locally or for some special reason extreme superheat temperatures are required. It may also be used as an auxiliary to the heating boilers in buildings.

Figs. 44–59 illustrate another exemplification of the invention of the portable type described in connection with Figs. 1–37. The design of Fig. 44 is characterized chiefly by a modified arrangement of the radiation element, that part of the resistor wire, which does the principal superheating, being located in the inner channel of the supporting refractory tube and not inside the nozzle as in Figs. 1 and 19. Another major difference as compared to Fig. 19 is the construction of the rotary valve.

The particular device of the invention is described in detail as follows:

The boiler 301 consists of a cylindrical shell closed by two flat ends. The central opening in the upper part of the shell is closed by an unscrewable inlet fixture 302, herein called screw top, which extends by means of feed pipe 303 into the boiler to a desired point, for reasons explained later. The screw top is further composed of a flap cover 304, hinged as at 305 and being pressed into a closed position by the steel spring 306, while it may manually be opened through the ring catch 307. The spring cover 304—306, or safety valve, is of ample radius and serves for convenient tanking and retanking as well as for automatic steam pressure relief in case of spraying. The whole inlet fixture may temporarily be removed for rinsing and cleaning the boiler interior.

Through the lower boiler section passes the tubular duct 308, connected with and reenforcing the boiler heads by locknuts or other appropriate means. The duct 308 encloses the radiation element and the rotary sleeve valve of Fig. 50.

In the upper front section of the duct 308 are two properly spaced holes 309, 310, around which is heat- and leakproof secured to said duct 308 a cylindrical or boxlike slug-drum 313, leading at its top into a bent inlet pipe 314. Said pipe is closed at its other end but has adjacent thereto and at the upper side a plurality of small holes 315.

The tubular ceramic body 317, herein called refractory tube, supports two helical heating wire coils 325, 326, and is inserted through the rear end of the duct 308 and firmly secured thereinto in a concentric position by an appropriate means. As shown in Fig. 44, the front section of the refractory tube 317 is screwed through the threaded central opening of rotary valve member 331, and the rear end 316 of the refractory tube is screwed to the duct 308. The two resistor coils 325, 326, one being outside, the other inside the refractory tube, are connected with each other and with the terminals 322, 323 of the heating unit. Ceramic pipelets 320, 321 insulate the respective wire ends. The front entrance of the refractory tube is normally closed by a removable ceramic plug 327, whose fine inside hole serves for securing the wire ends and also as a sort of safety outlet for the superheater in case of excessive pressure therein. The terminals 322, 323 complete the electric energy supply circuit.

The easily exchangeable, low cost radiation element is designed to operate at a safe average temperature (red glow) and at a maximum of free radiation. For the latter purpose a number of ceramic ring bushings 324 hold the coiled wire 325 in suspension and in an adequate distance from both the refractory tube 317 and the vapor duct 308. The refractory tube 317 may of course also be so extruded as to have outside edges, upon which said wire will rest without unduly interfering with its radiating power.

Into the front portion of duct 308, as shown in Fig. 49, is entered the rotary sleeve valve of Fig. 50 to form a steamtight and yet rotatable closing part thereof.

The valve consists of a short cylindrical tube 328 with an outside diameter corresponding to the inside diameter of the vapor duct 308. The thermal expansion coefficient of the two parts 328 and 308 must of course also match.

The valve tube or cylinder 328 is provided with two parallel slots 329, 330, which in width and spacing match the duct openings 309 and 310, respectively, communicating with them as described below.

A ceramic member 331 (Figs. 51–53) resembling an inside threaded shoulder bushing with a forwardly projected tongue 332, is solidly secured inside the valve cylinder 328 between the two aforementioned slots 329, 330. Upon proper insertion of the valve into the duct 308, said member 331 will form a steamtight partition between the duct space 308 to the right and what I call the valve chamber to the left. Into the latter extends the perforated front end of the refractory tube 317.

The front end of the valve cylinder 328, protruding from the duct 308, will be closed by a screwed fitting 333 having a threaded outlet 336. This connection, which holds a circular filter plate 335 in place, is locked by screwing an insulated knob or handle 334 to the valve cover 333. By means of this handle 334, valve cylinder 328 and its inside fixture 331 can conveniently be rotated back and forth (see dot and dash arrows of Fig. 47) within the limit, marked by two set screws 337, 338, of a scale 339, which is printed or attached to the boiler casing 352.

As the two slots 329, 330, directly under the duct openings 309 and 310, respectively, are of equal length and staggered to the extent of the diameter of either duct opening, and as the tongue 332 of valve member 331 moves correspondingly around the refractory tube front section containing the perforations 319, these stationary boiler and superheater outlets 309, 310 and 319 are alternately being opened or closed by the rotation of the valve, releasing steam from the boiler into the valve outlet 336 (a) either directly through the valve chamber as shown by the full line arrows of Fig. 44 (Figs. 44, 54, 55 show valve handle 334 in a starting position at set screw 337, outlet 309 fully open, outlets 310 and 319 fully closed), (b) or first through the vapor duct 308 and the inside channel of refractory tube 317 as shown by the dot and dash arrows in Fig. 44 (Figs. 58, 59 show valve handle 334 at the final right hand position 338, outlet 309 fully closed, outlets 310 and 319 fully open), (c) or by way of both the valve chamber and the superheater conduits at the same time. (Figs. 50, 56, 57 show all outlets 309, 310, 319 wide open, if handle 334 is in the center position with respect to the scale 339 of Fig. 47.)

As the opening and closing of the stationary outlets 309, 310, 319 by their respective movable counterparts 329, 330, 332 is synchronized with the angles described by handle 334 on the scale 339, the valve mechanism, by simply sliding the handle to a point at or near the indicated three key positions of Figs. 54–59, regulates the amount of steam passing through, respectively bypassing the superheater, tongue 332 effecting a corresponding measure of interflow of saturated and highly superheated steam, which together brings about instantaneously a desired adjustment of the steam discharge as to heat degree and humidity contents.

The extreme left and right corner positions of the valve at 337 and 338 deliver only saturated steam of minimum temperature (boiling point) or only superheated steam of maximum heat and quality, respectively.

All intermediate valve positions from 337 to 338 produce a mixture of saturated and superheated steam, whose properties vary in proportion to their respective volumes determined by the throttling of either the boiler outlet 309 or the boiler and superheater outlets 310 and 319.

At the center position of Figs. 47, 50, 56, 57 all conduits are wide open resulting in a steam outflow, which is mixed in equal parts to a medium superheat degree.

Relatively minor outside mountings of my apparatus are the boiler handle 340, vapor nozzle 345, 346 of Fig. 45, spraying accessory 350, 351 of Fig. 46, the boiler casing 352 and a small reflector lamp 357.

The handle 340 is a cylindrical, thin-walled vessel screwed to a fitting extending from the bottom of the apparatus. Around the handle neck is a rigid belt 341 with two rings 342 and 343, which keep the long cord 347 and the rubber hose 349 at hand. By giving the cord enough allowance between the ring 342 and the terminals 322, 323, the contact plug 348 at the forward end of the cord permits connection and disconnection of the heating unit as conveniently as a switch. By passing the rubber hose 349 through ring 343, immediate interruption of spraying can be effected by squeezing the hose with the forefinger of the hand holding the appliance. Handle 340 is detachable to be filled with liquid for spraying. The handle interior at its bottom leads into a short bent tubing 344 connected with the spraying accessory of Fig. 46 by means of said rubber hose 349.

The vapor nozzle of Fig. 45 is at least 12 inches long and composed of two interchangeable parts 345, 346. The rigid main section 345 is insulated to prevent possible scorching as well as undue heat losses and gives also firm support to the exposed flexible extension 346, which, being very hot during operation, is given the desired direction through contact with the object under treatment.

The vapor nozzle is connected with the threaded valve outlet 336 and interchangeable at this point with the horizontal member 351 of the spraying accessory of Fig. 46. The vertical spraying member 350 is adjustable.

The boiler casing 352 is a very light two-part insulating tube with a flat base, pushed over the boiler. Air space in between provides for better insulation and at points 353, 354 also for enclosure of the supply wires (not shown), which connect the lamp 357 through the eyelets 355, 356 of the respective terminals 322, 323 with the source of electricity feeding the heating element.

The apparatus is properly tanked by holding it upside down immediately after filling. Feed pipe 303 is of a length calculated to release all liquid in excess of the correct initial quantity. The filling thus retained in the boiler is indicated in Fig. 44 by the dot and dash water-line a and corresponds, when the apparatus is returned to a normal upright position or tilted vertically downward or upward, with the respective waterlines b, c or d. When the boiler is turned 360 degrees in all directions, the water level circumscribes a space, roughly indicated by rectangle ABCD, which remains always completely water-free.

The location of steam intake 315 within this water-free space excludes, after proper tanking, any possibility of water access into the vapor duct 308 irrespective of how the apparatus is being manoeuvered during operation. The slugdrum 313 is an additional safeguard protecting the exposed radiation element inside the duct 308 from possible contact with liquid.

When the heating element is energized by plugging the cord to the wall outlet, electric heat will be transferred through radiation to the duct 308 and from there by convection and conduction to the boiler liquid. Steaming will be quick because of the great heat efficiency and small filling of the flue-type boiler. As the heat losses are small, an element of nominal wattage will assure adequate evaporative and superheating capacity.

The portable appliance is designed to produce dry vapor, which contains no liquid. Water particles suspended in the steam will be arrested by the perforations of steam intake 315, refractory tube entrance and exit 318 and 319, respectively, and the filter plate 335. By far the greatest drying effect upon the steam flow, however, is exerted by the exposed radiation wire 325 inside the duct 308. When the steam passes through the narrow refractory tube channel enclosing the radiation coil 326, it will be subjected to the most intense direct and reflected radiation. The emerging superheated steam is of an extraordinary heat degree and of a gaslike quality.

It will be apparent to those skilled in the art that the novel principles of the invention disclosed herein in connection with specific exemplifications thereof will suggest various other modifications and applications of the same. It is accordingly desired that in construing the breadth of the appended claims they shall not be limited to the specific exemplifications of the invention described herein.

I claim:

1. The method of electric superheating consisting of conducting vapor continuously along and through a narrow walled elongated space containing and closely enclosing an elongated bare resistor structure energized by an electric current to emit radiant heat having a temperature within said space substantially higher than the temperature of the vapor passing through said space, the cross-section and length of said space and said resistor structure being so proportioned that substantially all vapor passing through said space along said resistor structure must flow in contact with and intimate proximity to the bare radiating surface of said resistor structure whereby substantially all vapor leaving the outlet end of said space has become superheated.

2. The superheating method as defined by claim 1 utilized for converting saturated steam into superheated steam of a desired temperature.

3. The method as defined by claim 1 applied to low-pressure vapor to produce high temperature without materially increasing the vapor pressure.

4. In a vapor generating system for supplying superheated vapor of a desired temperature: an elongated insulated duct structure of limited cross-sectional space having an inlet end and an outlet end, the inlet end being connected with the source of vapor; bare electric resistor elements constituting a generally elongated resistor structure extending through the space of said duct structure and completely enclosed thereby and spaced from the inner wall of the duct structure; means for passing electric current through said resistor structure so that the generated heat radiated therefrom through the space of said duct structure is maintained at a temperature substantially higher than the temperature of the vapor flowing through said duct structure; means for regulating the operating temperature of said resistor structure relatively to the amount of vapor flowing through said duct structure; the cross-section and length of said duct structure and said resistor structure being so proportioned that substantially all vapor passing through said duct structure along said resistor structure must flow in contact with and intimate proximity to the bare radiating surface of said resistor structure whereby substantially all vapor leaving the outlet end of said duct structure has been superheated to the desired temperature.

5. An electric radiant superheater as defined by claim 4 in which the duct structure or its inner wall consists of ceramic or other heat resisting insulation material permitting the bare resistor structure to be in partial contact therewith for support.

6. A vapor generating and superheating system as defined by claim 4 in which the vapor generator and the elongated radiant superheater connected therewith form a portable hand-operable unit.

7. The method of quick and accurate temperature regulation of superheated vapor, consisting of intermixing highly superheated vapor discharged from an electric radiant superheater as defined by claim 4 with vapor having a substantially lower temperature, and controlling the proportion and temperature difference of the vapor quantities being intermixed to attain the exact temperature desired for the total vapor quantity.

8. In a vapor supply system for quick and accurate temperature regulation of the vapor, two duct structures connected with the source of vapor, one of the duct structures constituting an electric radiant superheater as defined by claim 4, operating at a temperature to effect relatively high superheating of the vapor passing therethrough; means for varying the amount of vapor passing through either duct structure, thereby varying the temperature difference of the vapor quantities leaving said two duct structures; and a common outlet port for merging the vapor flow from both duct structures, thereby equalizing the temperature difference of the merging vapor quantities to the superheat degree desired for the total vapor discharge from said common outlet port.

9. A vapor superheater having in combination in a unitary structure a liquid container, means for supplying heat to said container to generate saturated vapor therefrom, means to conduct away and isolate the vapor from said liquid container comprising a superheating duct having insulating walls, naked electric resistor heating elements in said duct and closely surrounded thereby, connections for supplying electric power to said heating elements, including flexible conductors, and outer protective heat insulation for enabling the unitary structure to be handled manually.

10. A vapor superheater having in combination in a unitary structure a liquid container, means for supplying heat to said container to generate saturated vapor therefrom, means to conduct away the vapor from the generator free from the liquid in all positions of the unitary structure and to a duct of insulating material closely confining naked resistor heating elements, and means for supplying electric current thereto for superheating the vapor.

11. A vapor superheater formed as a hand manipulating implement, having connections for supply of saturated steam, means to conduct and control the steam to a superheating duct, insulation surrounding said duct and closely confining therein bare electric resistor wire for direct contact with the steam passing therein, and means of free exit of the superheated steam directed by manipulation of the implement.

12. A vapor superheater formed as a hand manipulating implement, having connections for supply of saturated steam, means to conduct and control the passage of steam to a superheating duct formed in insulating material closely confining therein bare electric resistor elements for direct contact with the passing steam, and means to vary the electric current to control the degree of superheating.

13. A superheating steam hand implement adapted for removing coating material from its base, having a source of steam, a duct with ceramic walls closely confining bare electric resistance heating elements for direct contact with passing steam to superheat it and means to direct it to impinge on the coating material, and means to vary the temperature of the emitted superheated steam.

LOUIS J. LEHER.

REFERENCES CITED

The following references are of record in the file of this patent:

UNITED STATES PATENTS

| Number | Name | Date |
|---|---|---|
| 1,403,594 | Duo | Jan. 17, 1922 |
| 1,707,453 | Winogradow | Apr. 2, 1929 |
| 1,727,995 | Lechler | Sept. 10, 1929 |
| 1,836,247 | Hills | Dec. 15, 1931 |
| 1,855,898 | Alexander | Apr. 26, 1932 |
| 2,000,277 | Durkee | May 7, 1935 |
| 2,012,523 | Thorne et al. | Aug. 27, 1935 |
| 2,043,002 | Lechler | June 2, 1936 |
| 2,291,423 | Tiscornia | July 28, 1942 |

FOREIGN PATENTS

| Number | Country | Date |
|---|---|---|
| 104,997 | Austria | Dec. 10, 1926 |